(12) United States Patent
Schlapik

(10) Patent No.: US 11,486,551 B2
(45) Date of Patent: Nov. 1, 2022

(54) ILLUMINATED LEVITATING WAND

(71) Applicant: Kevin D. Schlapik, Fort Lauderdale, FL (US)

(72) Inventor: Kevin D. Schlapik, Fort Lauderdale, FL (US)

(*) Notice: Subject to any disclaimer, the term of this patent is extended or adjusted under 35 U.S.C. 154(b) by 0 days.

(21) Appl. No.: 17/214,509

(22) Filed: Mar. 26, 2021

(65) Prior Publication Data
US 2021/0215303 A1 Jul. 15, 2021

Related U.S. Application Data

(63) Continuation of application No. 16/740,307, filed on Jan. 10, 2020, now Pat. No. 10,962,179.

(60) Provisional application No. 62/928,273, filed on Oct. 30, 2019, provisional application No. 62/791,580, filed on Jan. 11, 2019.

(51) Int. Cl.
| | |
|---|---|
| *F21L 4/02* | (2006.01) |
| *A45B 3/04* | (2006.01) |
| *A63J 21/00* | (2006.01) |
| *F21V 23/06* | (2006.01) |
| *F21V 23/00* | (2015.01) |

(52) U.S. Cl.
CPC ...... *F21L 4/02* (2013.01); *A45B 3/04* (2013.01); *A63J 21/00* (2013.01); *F21V 23/007* (2013.01); *F21V 23/06* (2013.01)

(58) Field of Classification Search
CPC .... A45B 3/00; A45B 3/02; A45B 3/04; A45B 2200/1018; A45B 9/00; A45B 9/02; A63J 5/02; A63J 5/12; A63J 21/00

USPC ............ 472/61, 71, 75, 81; 362/102
See application file for complete search history.

(56) References Cited

U.S. PATENT DOCUMENTS

| | | | | |
|---|---|---|---|---|
| 2,242,981 | A | 5/1941 | Pedersen | |
| 2,911,521 | A * | 11/1959 | Schetz | F21V 33/00 362/128 |
| 5,036,442 | A * | 7/1991 | Brown | A63B 15/02 362/249.14 |
| 5,356,343 | A * | 10/1994 | Lovetere | A63J 21/00 446/485 |
| 5,432,028 | A * | 7/1995 | Barlow | H01M 6/48 429/185 |

(Continued)

FOREIGN PATENT DOCUMENTS

| | | |
|---|---|---|
| GB | 2277455 A | 2/1994 |
| WO | 98/19761 A1 | 5/1998 |
| WO | 2018/053519 A1 | 3/2018 |

OTHER PUBLICATIONS

International Search Report and Written Opinion dated Apr. 6, 2020, issued in corresponding International Application No. PCT/US2020/013219, filed Jan. 10, 2020, 8 pages.

(Continued)

*Primary Examiner* — Kien T Nguyen
(74) *Attorney, Agent, or Firm* — IPkey PLLC

(57) ABSTRACT

Wands of the present disclosure have features that increase entertainment value, improve portability, durability, and balance, making the wands especially well-suited for use in creative routines. The wands include a middle section or an end section that at least partially houses a light engine, and at least one pole configured to couple to the middle section or end section in an axially-aligned assembly. The light engine causes the pole to transmit light.

20 Claims, 7 Drawing Sheets

(56) References Cited

U.S. PATENT DOCUMENTS

| | | | |
|---|---|---|---|
| 6,432,028 B1 | 8/2002 | Ortloff | |
| 6,626,728 B2 * | 9/2003 | Holt | A63H 33/22 |
| | | | 446/175 |
| 7,445,550 B2 * | 11/2008 | Barney | G09G 3/001 |
| | | | 446/175 |
| 7,955,157 B1 | 6/2011 | Hedeen, Jr. | |
| 2003/0223247 A1 | 12/2003 | Karras | |
| 2004/0156189 A1 | 8/2004 | Opolka | |
| 2007/0019398 A1 | 1/2007 | Chen et al. | |
| 2016/0271511 A1 | 9/2016 | Forti | |
| 2018/0214785 A1 | 8/2018 | Hornsby et al. | |

OTHER PUBLICATIONS

"Flowlight Wand: Demo and intro of Flowtoys LED levitation wand," Youtube, Mar. 24, 2010 <https://www.youtube.com/watch?v=o4xBPoO07xo> [retrieved Nov. 17, 2020].

"Pyroterra Lighttoys Visual Wand Review," Youtube, Jul. 4, 2018, <https://www.youtube.com/watch?v=v55-e7cCi00> [retrieved Nov. 17, 2020].

"Review of Atomic Astral Wand by Astral Hoops," Youtube, Aug. 12, 2013, <https://www.youtube.com/watch?v=GrnmCIGLygU> [retrieved Nov. 17, 2020].

\* cited by examiner

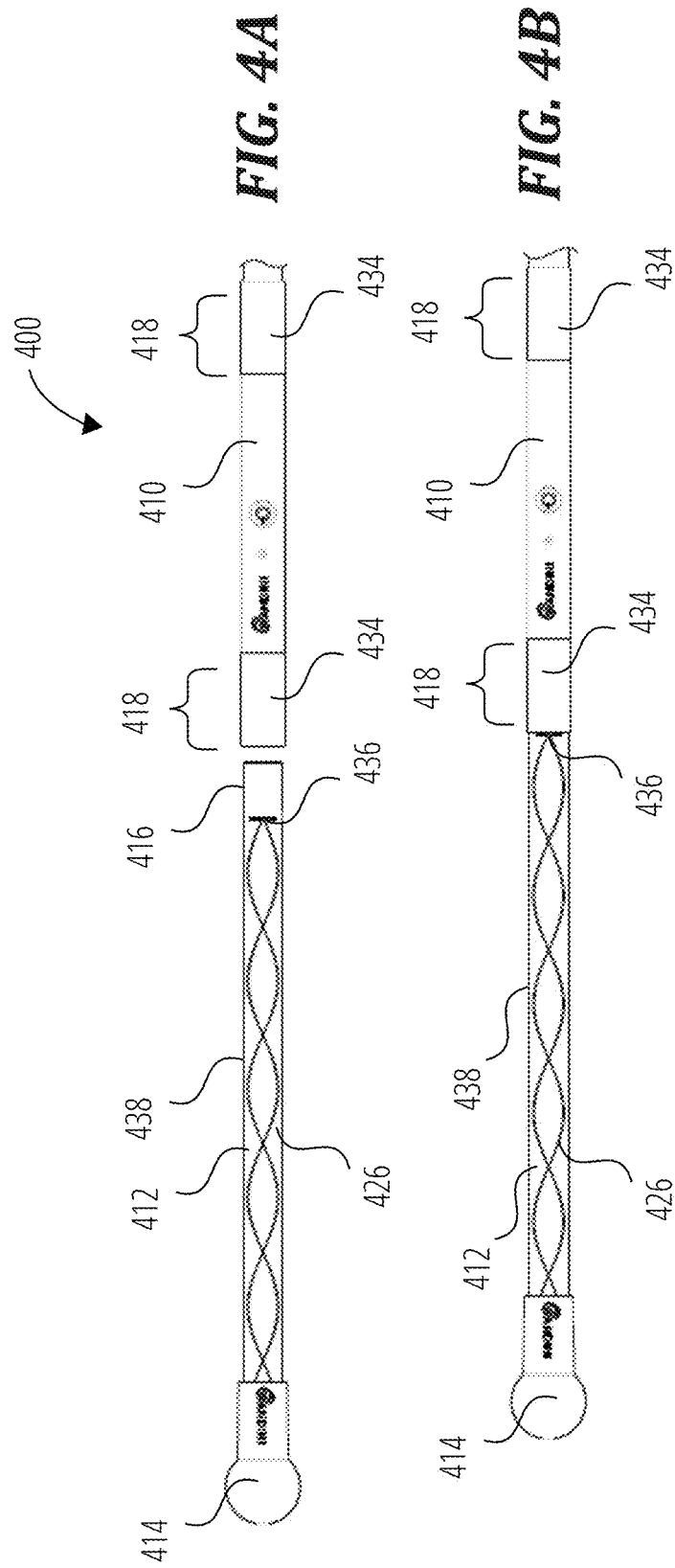

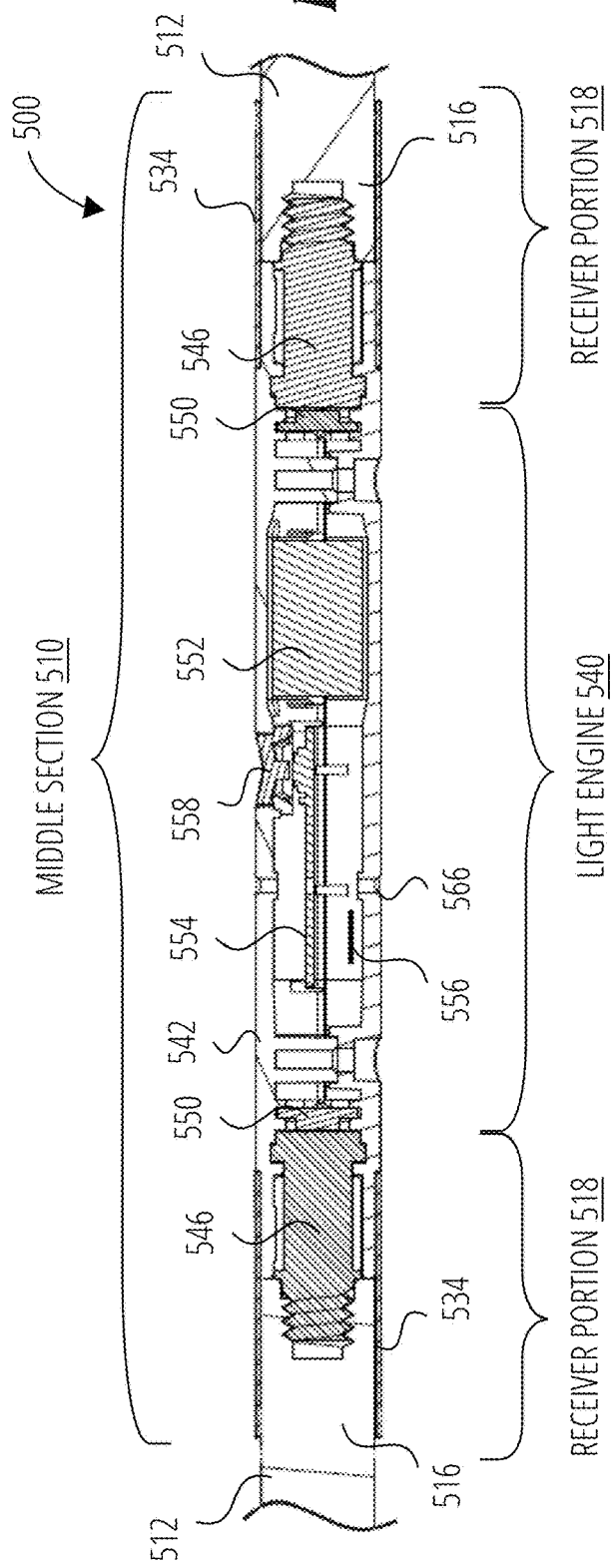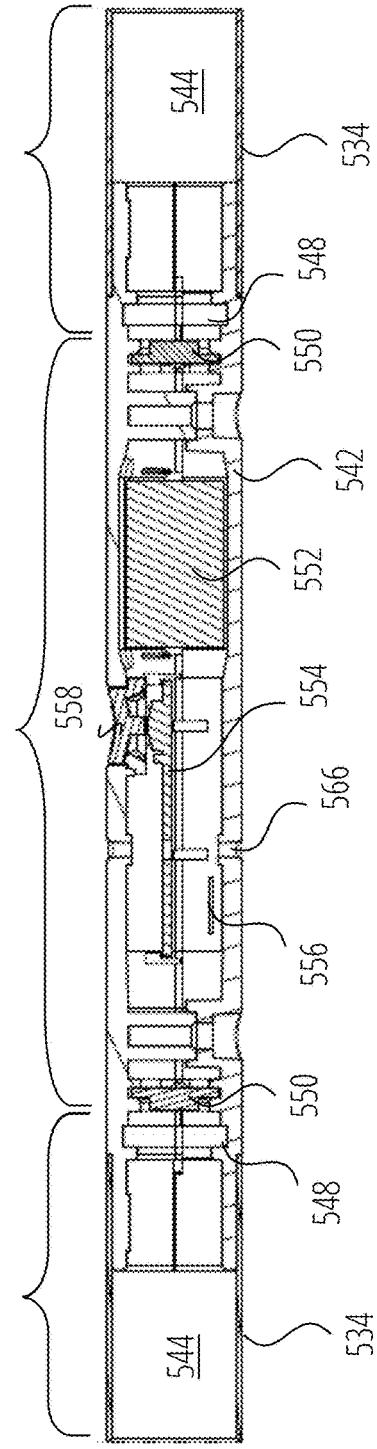

ILLUMINATED LEVITATING WAND

CROSS-REFERENCE TO RELATED APPLICATIONS

This application is a continuation of U.S. application Ser. No. 16/740,307, filed Jan. 10, 2020, which claims the benefit of U.S. Provisional Application No. 62/791,580, filed Jan. 11, 2019, and U.S. Provisional Application No. 62/928,273, filed Oct. 30, 2019, the entire contents of which are hereby incorporated by reference for all purposes.

BRIEF SUMMARY

Wands of the present disclosure have features that increase entertainment value, improve portability, durability, and balance, making the wands especially well-suited for use in creative routines. The wands include a middle section or an end section that at least partially houses a light engine, and at least one pole configured to couple to the middle section or end section in an axially-aligned assembly. The light engine causes the pole to transmit light.

In an aspect, the present disclosure provides a wand having an end section and at least one pole configured to couple to the end section in an axially-aligned assembly. The end section at least partially houses a light engine that causes the pole to transmit light.

In another aspect, the present disclosure provides a wand, including a middle section, a first pole, and a second pole. The middle section at least partially houses a light engine. The first pole and the second pole are each configured to couple to the middle section in an axially-aligned assembly. The light engine causes the first pole and the second pole to transmit light.

In some embodiments, the light engine includes at least one light, a power source, and a controller in electrical communication with each other, the controller being programmed with at least one module that controls illumination of the at least one light.

In some embodiments, the at least one light includes at least a first light and/or a second light, the first light being located in the middle section (or end section) adjacent to a first receiver portion thereof, and the second light being located in the middle section (or end section) adjacent to a second receiver portion thereof. The first light and the second light are configured to transmit light axially outwardly from the middle section (or end section) through the first pole and the second pole, respectively.

In some embodiments, the controller and the power source are positioned between the first light and the second light.

In some embodiments, the at least one light includes at least a first light and/or a second light, the first light being located in the first pole, and the second light being located within the second pole. The first pole and/or the second pole has at least one electrical contact that establishes electrical communication with the controller and the power source when the electrical contact is coupled to the middle section (or end section) in the axially-aligned assembly.

In some embodiments, the first pole and/or the second pole are reversibly couplable from the middle section (or end section) such that the wand is configured to break down into to a disassembled state in which the first pole and/or the second pole are not coupled with the middle section (or end section).

In some embodiments, the middle section (or end section) includes at least one axially-aligned receiver portion, e.g., two axially-aligned receiver portions located at opposite ends of the middle section (or end section). Each receiver portion has a cavity with an open end facing axially away from the middle section (or end section). The first pole and/or the second pole have an insertion end configured for insertion into the cavity of at least one receiver portion.

In some embodiments, at least one insertion end includes a threaded portion, and at least one receiver portion includes a complementary threaded portion.

In some embodiments, the complementary threaded portion of the receiver portion is a threaded pin.

In some embodiments, at least one pole has a uniform first diameter. In some embodiments, the second pole has a uniform second diameter that is the same or different from the uniform first diameter.

In some embodiments, the insertion end of at least one pole includes an engagement member fitted thereto, and at least one receiver portion of the middle section (or end section) includes a retention portion configured to engage the engagement member.

In some embodiments, at least one pole has an indicator on an outer surface thereof that indicates proper coupling with the middle section (or end section).

In some embodiments, at least one receiver portion includes a shroud that covers at least a portion of at least one pole when the at least one pole is coupled with the middle section (or end section).

In some embodiments, the shroud is configured to cover about 1 cm to about 10 cm of at least one pole.

In some embodiments, the shroud is configured to at least partially cover a maximum diameter portion of at least one pole.

In some embodiments, the wand further includes at least one of the following: a tether connected to the middle section (or end section); a holding piece connected to the tether; at least one end cap couplable to at least one pole; and/or a charging cord configured to electrically communicate with the light engine.

In some embodiments, the tether passes through a hole in the middle section (or end section) positioned between 1 cm and 10 cm from a longitudinal center thereof.

In some embodiments, at least one end cap has a maximum width that exceeds a maximum width of at least one pole.

In some embodiments, the first pole has a first weight, and the second pole has a second weight that differs from the first weight.

BRIEF DESCRIPTION OF THE SEVERAL VIEWS OF THE DRAWINGS

Non-limiting and non-exhaustive embodiments of the present invention are described with reference to the following figures, wherein like reference numerals refer to like parts throughout the various views unless otherwise specified.

FIG. 4A shows a partial side view of a wand formed in accordance with one representative embodiment of the present disclosure, with a pole disassembled from a middle section.

FIG. 4B shows a partial side view of the wand of FIG. 4A, with the pole assembled with the middle section.

FIG. 5A shows a partial side section view of a wand formed in accordance with one representative embodiment of the present disclosure.

FIG. 5B shows another partial side section view of the wand of FIG. 5A.

DETAILED DESCRIPTION

The present disclosure, including the accompanying drawings, photographs, and schematics, provides illuminated "levitating" wands having a light engine with one or more LEDs or other lights. In the following description, numerous specific details are set forth to provide a thorough understanding of representative embodiments. One skilled in the relevant art will recognize that the techniques described herein can be practiced without one or more of the specific details, or with other methods, components, materials, etc. In other instances, well-known structures, materials, or operations are not shown or described in detail to avoid obscuring certain aspects.

Reference throughout this specification to "an embodiment" or "some embodiments" means that a particular feature, structure, or characteristic described in connection with the embodiment is included in at least one embodiment of the present invention. Thus, the appearances of the phrases "in some embodiments" or "in an embodiment" in various places throughout this specification are not necessarily all referring to the same example. Furthermore, the particular features, structures, or characteristics of embodiments may be combined in any suitable manner in one or more examples.

This disclosure refers to a number of terms with respect to different embodiments (including apparatuses and methods). Terms having alike names have alike meanings with respect to different embodiments, except where expressly noted. Similarly, this disclosure utilizes a number of terms of art. These terms are to take on their ordinary meaning in the art from which they come, unless specifically defined herein or the context of their use would clearly suggest otherwise.

Figure 1:
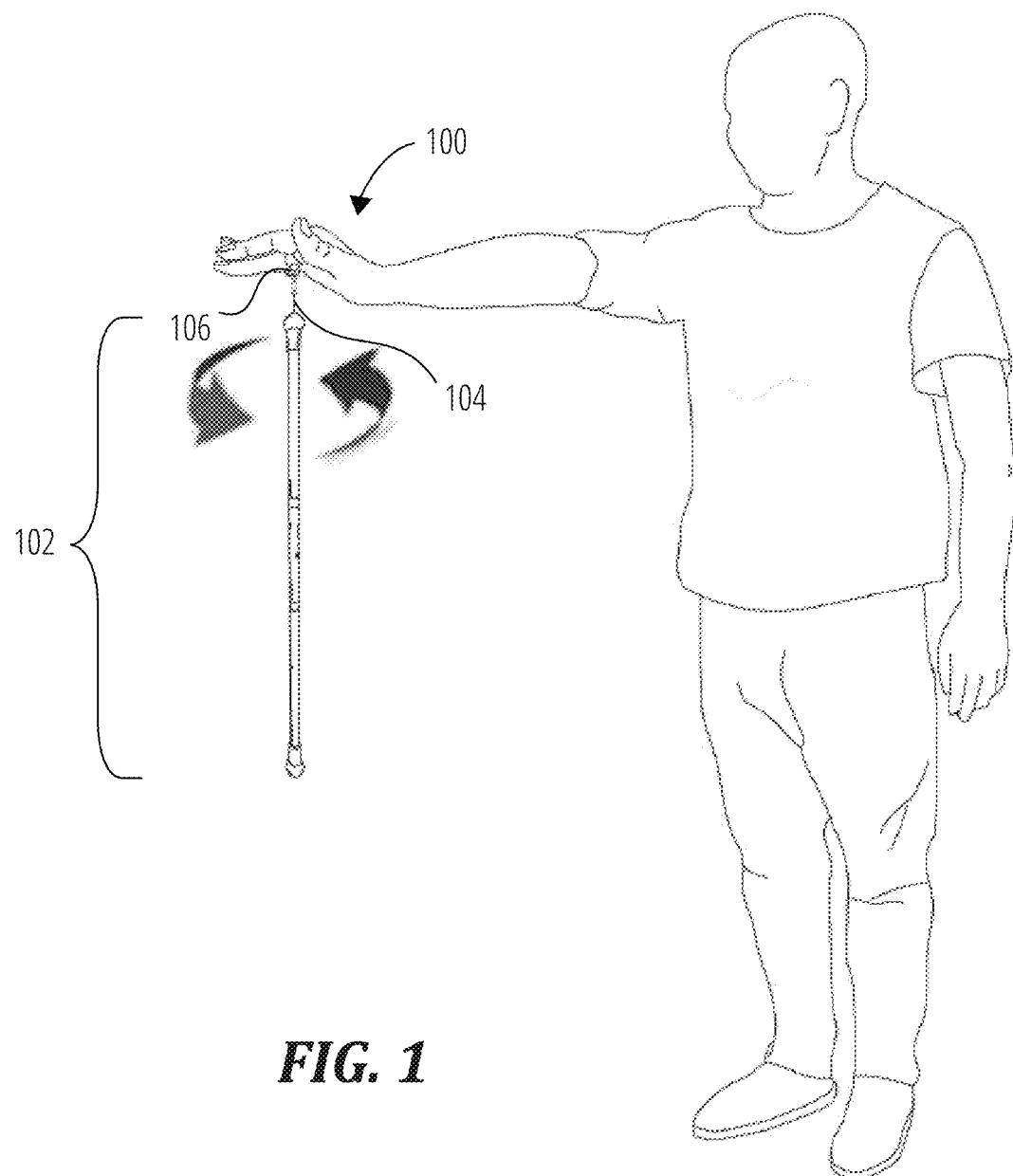
FIG. 1 shows a user using a wand formed in accordance with one representative embodiment of the present disclosure.

FIG. 1 shows a user performing a trick with a wand 100 constructed in accordance with a representative embodiment of the present disclosure. The wand 100 includes a number of features that make it exceptionally well-suited for performing tricks, illusions, dances, gymnastics, and other creative routines. For example, the wand 100 includes a wand portion 102, a tether 104 connected to the wand portion 102, and a holding piece 106 connected to the tether 104. A user holding the holding piece 106 can swing and spin the wand portion 102 to perform creative routines. For example, in a dark environment, the user can cause the wand portion 102 to "levitate" by activating a light engine (described below), and then swinging and spinning the wand portion 102 via the tether 104 and holding piece 106. The wand portion 102 can also be utilized without the tether 104 or the holding piece 106. Accordingly, the tether 104 and holding piece 106 are optional. As used herein, the term "wand" includes wands, baton, staffs, sticks, rods, and other elongate apparatuses.

As described in detail below, the wand 100 (and other wands of the present disclosure) includes many features that advantageously make it more fun, safer, more durable, more portable, and which provide additional advantages. For example, certain technical features give the wand 100 particular balance and handling characteristics (including off-balance characteristics) that make it better suited to creative routines. For example, certain features of the wand 100 cause the wand portion 102 to quickly return to a vertical orientation when suspended from the tether 104 and the holding piece 106, as shown in FIG. 1. As another example, certain technical features make the wand 100 more durable, i.e., less likely to break in the event that a user drops the wand 100. As another example, certain technical features improve the visual effects created by the wand 100 during creative routines. As another example, certain technical features enable the wand 100 to break down from an axially-aligned assembly into smaller sections, thereby improving portability. These examples are representative of the advantages provided by technical features of the wand 100, but are not the only advantages. It shall be appreciated that in some embodiments, one or more features of the wand 100 may be critical. The features described below contribute to these advantages individually and when combined with other features of the wand 100.

Figure 2:
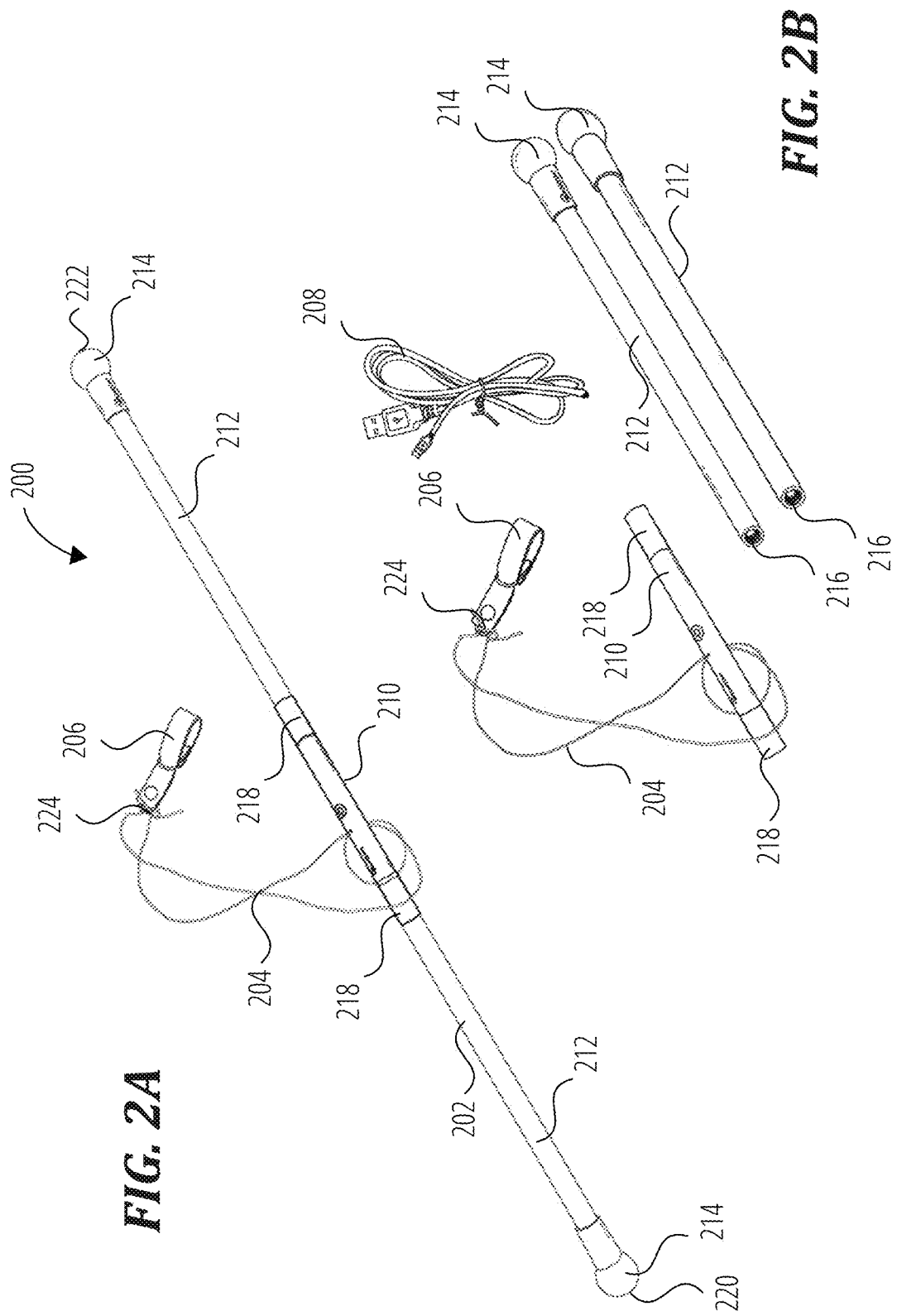
FIG. 2A shows a perspective view of a wand formed in accordance with one representative embodiment of the present disclosure, in an assembled state.
FIG. 2B shows a perspective view of the wand of FIG. 2A, in a disassembled state.

FIG. 2A and FIG. 2B show a representative wand 200 formed in accordance with the present disclosure. For convenience, the wand is collapsible, i.e., it disassembles into a plurality of pieces. FIG. 2A shows the wand 200 in an assembled state, whereas FIG. 2B shows the wand 200 in a disassembled state. The assembled state shown in FIG. 2A is generally the state in which the wand 200 is utilized in creative routines, whereas the disassembled state is generally the state in which the wand 200 is stored, transported, etc. The wand 200 includes a wand portion 202, an optional tether 204, and an optional holding piece 206. In some embodiments, the wand 200 includes only the wand portion 202. In some embodiments, the wand 200 includes an optional charging cord 208. In some embodiments, the wand 200 cannot be disassembled, i.e., it is assembled in a substantially permanent axially-aligned assembly.

In the assembled state shown in FIG. 2A, the wand portion 202 is an elongate, axially-aligned assembly. In some embodiments, it is configured to have particular balance and handling characteristics described below. The wand portion 202 of FIG. 2A includes a middle section 210, a plurality of poles 212, and a plurality of optional end caps 214 that couple together in the axially-aligned assembly. In some embodiments, the wand portion 202 includes a single pole 212 that couples with the middle section 210 in an axially-aligned assembly, rather than two poles 212. In such embodiments, the middle section 210 is located at an end of the wand portion 202 and may be considered an "end section." Thus, the term "middle section" is utilized to aid the understanding of the wand 200 of FIG. 2A and FIG. 2B, and is not intended to limit the present disclosure to embodiments having two poles. Each pole 212 is shown as a single piece in FIG. 2A and FIG. 2B, but breaks down into two or more sub-pole sections in some embodiments, for greater portability. In some embodiments, one or more of the foregoing components are reversibly couplable together in the axially-aligned assembly. In some embodiments, one or more of the foregoing components are substantially permanently coupled together in the axially-aligned assembly. For example, each end cap 214 is substantially permanently coupled together with one of the poles 212. In the embodiment of FIG. 2A and FIG. 2B, the poles 212 are each configured to reversibly couple to the middle section 210, and the end caps 214 are each configured to reversibly couple to one of the poles 212. As shown in FIG. 2B, each pole 212 has an insertion end 216 configured for insertion into a receiver portion 218 of the middle section 210. the end caps 214 may be formed from a relatively soft material as compared to the poles 212 (e.g., a relatively soft plastic, rubber, or foam) in order to absorb shock when the wand 200 is dropped. In some embodiments, each end cap 214 has a maximum width that exceeds a maximum cross sectional diameter of the poles 212, such that the end cap 214 is more likely to contact the ground before the poles 212 when the wand 200 is dropped. The end caps 214 shown in FIG. 2A and FIG. 2B have a spherical shape; however any shape is possible. For example, in some embodiments, one or more of the end caps 214 has the shape of a magic wand, or a tip of a magic wand.

For desirable balance, in some embodiments, the wand portion 202 has a length of between about 50 centimeters and about 150 centimeters (e.g., 60 centimeters), measured from a first end 220 to a second end 222. In some embodiments, the middle section 210 is between 10 centimeters and 20 centimeters long. In some embodiments, each pole 212 and end section 214 (coupled together) is between 15 centimeters and 50 centimeters long (e.g., 23 cm). For desirable balance, in some embodiments, the wand portion 202 portion has a total weight of about 0.1 kilograms to about 1.0 kilogram (e.g., 0.11 kilograms). In some embodiments, the middle section 210 weighs between 0.02 kilograms and 0.5 kilograms (e.g., about 0.04 kg). In some embodiments, each coupled pole 212 and end section 214 weighs between 0.02 kilograms and 0.5 kilograms (e.g., about 0.04 kg). In some embodiments, the poles 212 have different weights, which can advantageously cause the wand portion 202 to quickly return to a vertical orientation when suspended from the tether 204 (as shown in FIG. 1). For example, in some embodiments, a first pole 212 (coupled with a first end section 214) has a first weight, and a second pole 212 (connected with a second end section 214) has a second weight that is about 1% to about 20% greater than the first weight (e.g., about 7% greater). In some embodiments, this difference between the first weight and the second weight is about 0.001 kilograms to about 0.100 kilograms. In some embodiments, this difference between the first weight and the second weight is achieved by constructing the first pole 212 to a first length, and the second pole 212 to a different second length. In some embodiments, this difference between the first weight and the second weight is achieved by constructing the first pole 212 of a first material, and the second pole 212 of a different second material. In some embodiments, this difference between the first weight and the second weight is achieved by incorporating one or more voids (cavities) and/or weights in the first pole 212 and/or the second pole 212.

For desirable handling characteristics, the tether 204 is a length of cord, string, rope, cable, or the like having a length of about 50 centimeters to about 150 centimeters. In the embodiment of FIG. 2A and FIG. 2B, the tether 204 is a string. In some embodiments, the tether 204 is elasticized. In some embodiments, the tether 204 is formed of two or more sections of material, rather than one continuous section of material.

The holding piece 206 is a handle, loop, or similar component that helps a user swing, spin, and otherwise move the wand portion 202. In the embodiment of FIG. 2A and FIG. 2B, the holding piece 206 is a finger loop formed of leather, textile, or similar flexible material. In some embodiments, the holding piece 206 is a handle formed of plastic, wood, or similar rigid material. In some embodiments, the holding piece 206 is swivably connected to the tether 204, e.g., with a swivel 224 or similar element. In some embodiments, the holding piece 206 is directly connected to the tether 204.

The tether 204 and the holding piece 206 enable a user to swing, spin, and otherwise move the wand portion 202 in a variety of different maneuvers and/or creative routines. The tether 204 connects to the wand portion 202 proximate to a longitudinal center thereof, i.e., proximate to a longitudinal center between the first end 220 and second end 222 of the wand portion 202. In some embodiments, the tether 204 connects to the wand portion 202 proximate to a longitudinal center of a middle section of the wand portion 202, described below. In some embodiments, the tether 204 connects to the wand portion 202 at an off-center position, i.e., a position on the wand portion 202 spaced apart from the longitudinal center of the wand portion 202. For example, in some embodiments, the tether 204 connects to the wand portion 202 at an off-center location spaced apart from the longitudinal center by 1 cm to 10 cm. In such "off-center" embodiments, the wand 200 quickly returns to a "vertical" orientation when suspended from the tether 204. Details of the specific connections between the wand portion 202 and the tether 204 are described below.

Figure 3:
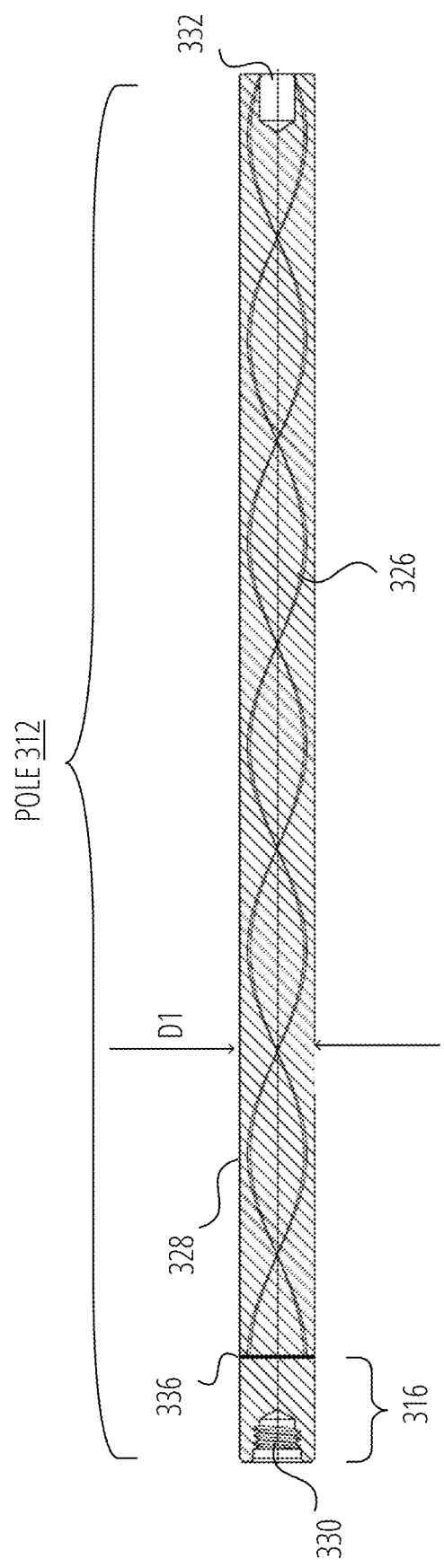
FIG. 3 shows a side section view of a pole of a wand formed in accordance with one representative embodiment of the present disclosure.

FIG. 3 shows a representative pole 312 formed in accordance with the present disclosure and configured for coupling with a middle section of a wand portion, such as the middle section 210 of FIG. 2A. In this embodiment, the pole 312 is at least partially formed of a durable, rigid, translucent or transparent material, for example acrylic or polycarbonate. As used hereafter, "translucent" includes both translucent, partially opaque, and transparent materials, i.e., materials that allow at least some visible light to pass therethrough. When the pole 312 is used with a light engine as described below, the translucent material allows the pole 312 to emit light, which makes the wand more entertaining and enhances creative routines. To make the wand even more entertaining, the pole 312 includes optional and integrally-formed passive light features 326 that reflect and/or refract light. In the embodiment of FIG. 3, the passive light features 326 include a plurality of etchings formed in an outer surface 328 of the pole 312, i.e., helical etchings. In other embodiments, the passive light features 326 include etchings having a different shape and/or size, e.g., a spiral shape. In still other embodiments, the passive light features 326 include a different number of etchings.

The pole 312 is shaped and dimensioned to improve balance and feel of the wand portion. In the embodiment of FIG. 3, the pole 312 is substantially cylindrical, has a total length of about 15 cm to about 50 cm (e.g., 23 cm), and has a largest cross sectional dimension D1 (diameter) of about 10 cm to about 30 cm (e.g., 13 cm). In FIG. 3, the pole 312 has a uniform diameter, which advantageously prevents stress concentration points along the length of the 302. In some wand portions having a first pole 312 and a second pole 312, the first pole 312 has a uniform first diameter and the second pole 312 has a uniform second diameter, which may be the same or different from the uniform first diameter. In some embodiments, the pole 312 has a non-circular cross section (e.g., a hexagonal or octagonal cross section). In still other embodiments, the pole 312 has a non-uniform largest cross-sectional dimension. In still other embodiments, each pole 312 has a fanciful or non-uniform shape; for example, in one embodiment, one or more of the poles 312 is shaped like a magic wand.

The pole 312 has an insertion end 316 configured for insertion into a receiver portion of a middle section (e.g., the middle section 210 of FIG. 2A). In FIG. 3, the insertion end 316 has a threaded portion 330 configured to threadably engage a complementary threaded portion of a receiver portion of a middle section. In FIG. 3, the insertion end 316 is a female threaded portion (the complementary threaded portion of the middle section would have a male threaded portion). In some embodiments, the insertion end 316 is a male threaded portion (the complementary threaded portion of the middle section would have a female threaded portion). As described below in connection with FIG. 5A and FIG. 5B, the complementary threaded portion of the receiver portion may be a threaded component (e.g., a threaded pin made of relatively soft plastic) that is removably insertable in the receiver portion of the middle section.

To prevent breakage of the pole 312 as a result of dropping the wand portion, the insertion end 316 has a uniform cross sectional dimension D1 (in this embodiment, a uniform diameter), thus reducing potential stress concentration points. In some embodiments, the cross sectional dimension of the pole 312 is not uniform, but the insertion end 316 has a cross sectional dimension that is no smaller than a central section of the pole. In some embodiments, the insertion end 316 does not have any sudden changes in cross sectional dimension, i.e., no step changes or only gradual changes in cross sectional diameter. To further prevent breakage, the pole 312 has an optional indicator 336 configured to visually indicate correct insertion of the insertion end 316 with a middle section of a wand. This is described below with respect to FIG. 4A and FIG. 4B.

The pole 312 has an optional end cap connection portion 332 configured to couple with an end cap. (such as the end cap 214 of FIG. 2A and FIG. 2B). In FIG. 3, the end cap connection portion 332 is a female recess configured to couple with a complementary male portion of an end cap. In some embodiments, the end cap connection portion 332 is a threaded portion, a detent, or a similar feature. In some embodiments, the pole 312 is configured to couple with the end cap by friction fit.

FIG. 4A and FIG. 4B illustrate part of a representative wand portion of a wand 400 that is similar to the wand 200 of FIG. 2A and FIG. 2B. The wand 400 includes a middle section 410, a pole 412, and an end cap 414. The middle section 410 has a plurality of receiver portions 418, each forming a cavity with an open end facing axially away from the middle section 410 and configured to receive an insertion end 416 of the pole 412. In some embodiments having a single pole 412, the middle section 410 has a single receiver portion 418. The pole 412 includes a plurality of passive light features 426 (in this case, etchings) formed therein, which are configured to reflect and/or refract light in an aesthetically pleasing manner. Further, each receiver portion 418 further includes an annular shroud 434 having a longitudinal orientation relative to the middle section 410. The shrouds 434 are configured to cover a portion of the pole 412 when the wand 400 is in an assembled state. In addition, pole 412 includes an optional indicator 436 configured to prevent breakage of the pole 412 by ensuring correct insertion of the insertion end 416 with a receiver portion 418 of a middle section 410. The indicator 436 is a marking, a groove, a score a label, or the like placed on an outer surface 438 of the pole 412. The indicator 436 is located on the pole 412 such that it indicates when the pole 412 is properly inserted (e.g., threaded) into the receiver portion 418 of the middle section 410.

As shown in FIG. 4A, the indicator 436 is located on the pole 412 at the insertion end 416. In some embodiments, the indicator 436 is spaced away from a most axially-distant point of the insertion end 416 by about 1 cm to about 10 cm, e.g., 2 cm. As shown in FIG. 4B, when the pole 412 is properly coupled with the receiver portion 418 of the middle section 410, the indicator 436 is adjacent to (i.e., visually "touches") a most axially-distant point of the receiver portion 418, thus indicating that the pole 412 is properly coupled with the middle section 410.

FIG. 5A and FIG. 5B show a representative middle section 510 of a wand portion of a wand 500. In FIG. 5A, the middle section 510 is reversibly coupled with two poles 512 in an assembled state. In FIG. 5B, the middle section 510 is decoupled from any poles. The poles 512 are similar to the pole 312 of FIG. 3. The middle section 510 and the poles 512 are configured such that poles 512 transmit light in the assembled state. In particular, the wand 500 includes a light engine 540 that transmits light through the poles 512, as described below. Further, the middle section 510 and the poles 512 are configured to increase strength of the wand 500, and to facilitate assembly/disassembly.

The middle section 510 includes an elongate, hollow outer housing 542 formed at least partially from a rugged material such as a metal and/or thermoplastic polymer. In FIG. 5A and FIG. 5B, the outer housing 542 is substantially cylindrical. In some embodiments, the outer housing 542 has a non-cylindrical cross section, e.g., a hexagonal or octagonal cross section. In some embodiments, the outer housing 542 is formed from a plurality of pieces, e.g., a multi-piece "clamshell" type construction.

The middle section 510 includes two axially-aligned receiver portions 518 located on either side of the light engine 540. Referring to FIG. 5B, each receiver portion 518 generally has a hollow or concave cavity 544 with an open end facing axially away from the middle section 510. Each receiver portion 518 is configured to reversibly couple with an insertion end 516 of one of the poles 512, e.g., by insertion of the insertion end 516 into the cavity 544. In FIG. 5A and FIG. 5B, each pole 512 is substantially the same and may be interchangeably coupled with either receiver portion 518. In some embodiments, the poles 512 have different coupling structures or other features such that one pole 512 can be coupled only with one receiver portion 518. In some embodiments having a single pole 512, the middle section 510 has a single receiver portion 518.

Each receiver portion 518 includes a shroud 534 (an annular cover) that covers the cavity 544, and which also covers at least a portion of the corresponding pole 512 (e.g., at least the insertion end 516 of the corresponding pole 512) when the wand 500 is in the assembled state, in order to prevent breakage when the wand 500 is dropped. The shrouds 534 may be formed from a rugged material such as a metal and/or thermoplastic polymer, in order to resist breaking when the wand 500 is dropped. In some embodiments, when the insertion end 516 of the pole 512 is received within the receiver portion 518, the shroud 534 covers about 1 cm to about 10 cm of the pole 512. In some embodiments, the shroud 534 at least partially covers a portion of the pole having a maximum cross sectional dimension, in order to increase strength of the wand 500. For example, if the insertion end 516 of the pole 512 has a reduced cross sectional dimension, the shroud 534 completely covers the reduced cross sectional dimension portion and extends over a maximum diameter portion of the pole 512 having a maximum diameter, such that the reduced cross sectional dimension portion does not form a stress concentration point.

As shown in FIG. 5A, each receiver portion 518 further includes a pin 546 configured to couple the insertion end 516 of one pole 512 with the outer housing 542. The pins 546 are not shown in FIG. 5B. Each pin 546 is formed of a translucent material, such that light emitted from the adjacent light engine 540 passes through the pin 546 and into the corresponding pole 512. At one end, the pin 546 is seated within or otherwise anchored to the outer housing 542, e.g., at the pin seat 548 shown in FIG. 5B. At the other end, the pin 546 has coupling structure that is complementary to the coupling structure of the insertion end 516 of the pole 512. In FIG. 5A, the pin 546 has a male threaded coupling structure complementary to the female threaded coupling structure of the insertion end 516 of the pole 512. In some embodiments, the pin 546 has a female threaded coupling structure that is complementary to a male threaded coupling structure of the insertion end 516 of the pole 512. In some embodiments, the insertion end 516 and pin 546 have different complementary coupling structure (i.e., non-threaded coupling structure). The pin 546 is formed from a rigid but relatively soft material such as a thermoplastic polymer (e.g., a translucent polymer), which in some embodiments is configured to absorb shock. Thus, by coupling the pole 512 to the relatively soft pin 546 rather than to a more rigid portion of the middle section 510, the pin 546 absorbs shocks when the wand 500 is dropped, preventing breakage. In the unlikely event the pin 546 breaks, it can be replaced.

The light engine 540 includes one or more lights and electronic elements that are together configured to project light in one or more directions and through one or more components of the wand 500, thereby making the wand 500 more entertaining. In the representative embodiment of FIG. 5A and FIG. 5B, the light engine 540 includes two lights 550, a power source 552, and a controller 554 that are in electrical communication. In particular, the light engine 540 is configured to transmit light through one or more of the poles 512 which, as discussed above, may be at least partially constructed from a translucent material. In FIG. 5A and FIG. 5B, the light engine 540 is substantially contained within the outer housing 542 of the middle section 510, such that light is transmitted outwardly (e.g., axially outward) from the middle section 510 through each of the poles 512. In some embodiments, one or more components of the light engine 540 are located in one or both of the poles 512. For example, in some embodiments, one or more of the poles 512 includes a light therein that transmits light directly out of the pole 512. In some embodiments, the light engine 540 is entirely contained in one or both of the poles 512, rather than the middle section 510. In some embodiments, the light engine 540 further comprises a single light that is located in the middle section 510, the single light being configured to transmit light outwardly from the middle section 510 in both directions through both poles 512.

In the representative embodiment of FIG. 5A and FIG. 5B, the lights 550 are each light emitting diodes (LEDs), which are well-suited to the wand 500 because they are durable, energy efficient, bright, programmable to flash, change colors, etc., and offer other advantages. Nevertheless, in some embodiments, one or more lights 550 are an incandescent light, a fluorescent light, a chemical light (e.g., a glow stick), or another type of light. In FIG. 5A and FIG. 5B, the lights 550 are positioned on opposite sides of the controller 554. In particular, each light 550 is securely retained by the outer housing 542 such that it projects light in an axially-outward direction.

Each light 550 is positioned within the middle section 510 such that light emitted therefrom passes into the corresponding pole 512. For example, in FIG. 5A and FIG. 5B, each light 550 is positioned within the outer housing 542 (on opposite sides of the power source 552 and controller 554) such that light emitted therefrom passes through the corresponding translucent pin 546 and into the corresponding pole 512. In some embodiments (e.g., embodiments without pins 546), each light 550 is positioned within the middle section 510 such that there is substantially no obstruction between the light 550 and the corresponding pole 512 in the assembled state. In some embodiments, one or more of the lights 550 is located within one or more of the poles 512, such that the light 550 emits light directly from the one or more poles 512. In such embodiments, each pole 512 having a light 550 positioned therein include electrical wiring, traces, and/or contacts that enable selective electrical connection between the pole 512 and the power source 552 when the pole 512 is assembled with the middle section 510. For example, the threaded portions of poles 512 and the threaded portion of the pins 546 may each contain electrical contacts configured to achieve electrical connection when the poles 512 are connected to the middle section 510 in an axially-aligned assembly. Accordingly, the pins 546 and/or the outer housing 542 of the middle section 510 may also include electrical traces or contacts establishing electrical communication with the controller 554, or may themselves form part of one or more electrical circuits of the light engine 540.

The power source 552 is a rechargeable battery, e.g., a lithium-ion battery, nickel-cadmium battery, nickel metal hydride battery, or similar. In some embodiments, the power source 552 is a non-rechargeable battery, e.g., a disposable alkaline battery. In embodiments in which the power source 552 is rechargeable, the middle section 510 includes a charging interface 556 (e.g., a mini universal serial bus connection or similar connection) configured to receive a charging cord (e.g., the charging cord 208 of FIG. 2B).

Figure 6:
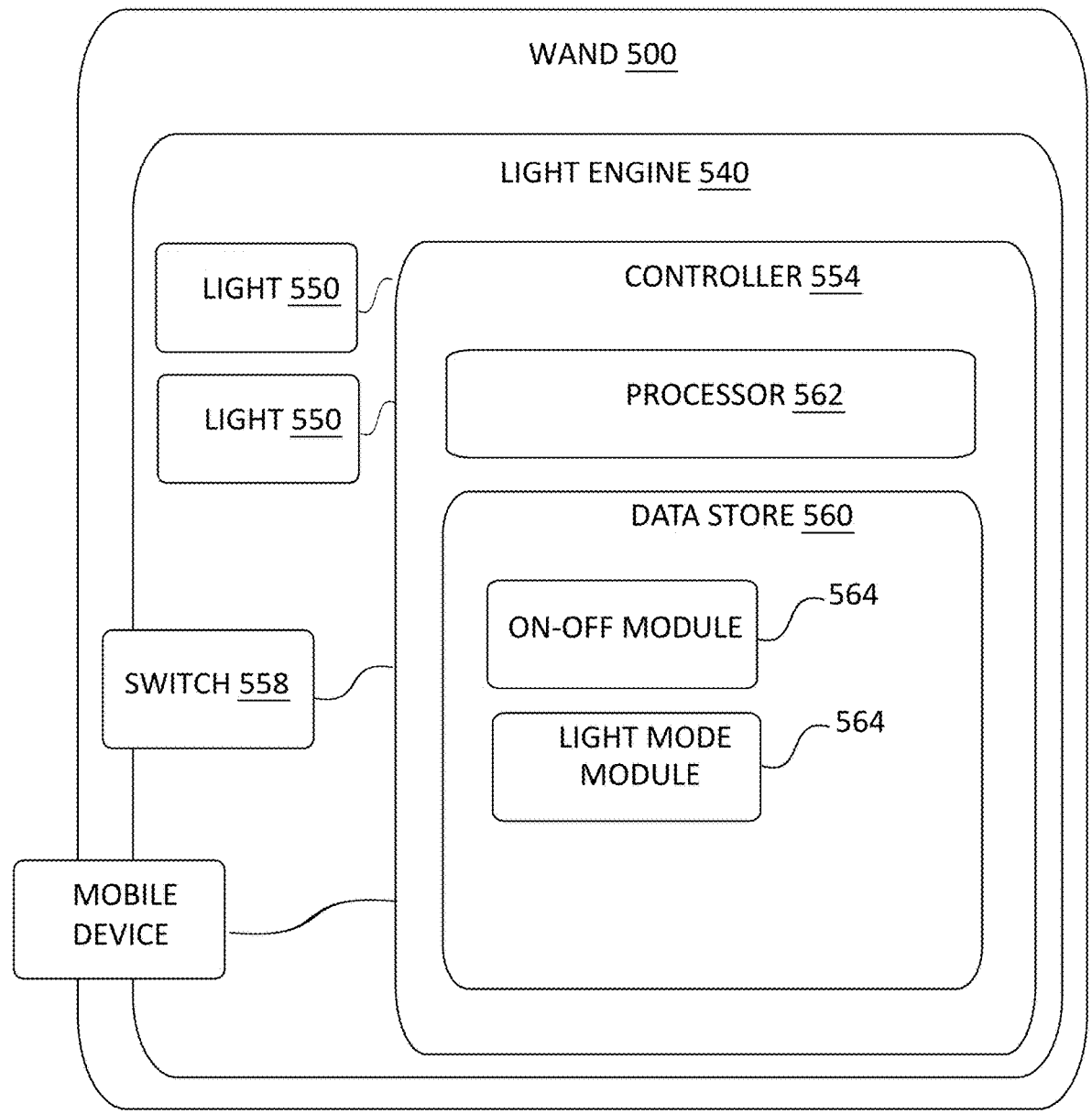
FIG. 6 shows a schematic of a controller of a wand formed in accordance with one representative embodiment of the present disclosure.

Referring briefly to FIG. 6, the controller 554 is a printed circuit board having a data store 560 (a tangible machine readable storage medium), a processor 562 (e.g., a general processing unit, graphical processing unit, application specific integrated circuit, and the like), and one or more modules 564 that may be implemented as software logic (e.g., executable software code), firmware logic, hardware logic, or various combinations thereof. As used in this disclosure, a data store is a tangible machine-readable storage medium that includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.). In some embodiments, the controller 554 includes a communications interface having circuits configured to enable communication with remote server, base station, or other network element via the internet, cellular network, RF network, Personal Area Network (PAN), Local Area Network, Wide Area Network, or other network. Accordingly, the communications interface may be configured to communicate using wireless protocols (e.g., WIFI®, WIMAX®, BLUETOOTH®, ZIGBEE®, Cellular, Infrared, Nearfield, etc.) and/or wired protocols (Universal Serial Bus or other serial communications such as RS-234, RJ-45, etc., parallel communications bus, etc.). In some embodiments, the communications interface includes circuitry configured to initiate a discovery protocol that allows the wand 500 and other network element to identify each other and exchange control information. In an embodiment, the communications interface includes circuitry configured to a discovery protocol and to negotiate one or more pre-shared keys. In an embodiment, the communications interface alternatively or additional includes circuitry configured to initiate a discovery protocol that allows an enterprise server and the wand 500 to exchange information.

Referring still to FIG. 6, the modules 564 include one or more executable programs. For example, the modules 564 include an on-off module 564 and a light mode module 564. The on-off module 564 cycles the lights 550 on and off in response to activation of the switch 558. The light mode module 564 cycles through a plurality of light modes when the switch 558 is activated in a particular sequence, e.g., one or more fade light modes, one or more solid color light modes, one or more strobe light modes, etc. These modules 564 are representative and non-limiting. For example, different light modes not listed above are contemplated. While the representative wand 500 of FIG. 5 includes numerous modules 564, some embodiments include additional modules 564, fewer modules 564, or different modules 564. In some embodiments, the controller 554 includes only a single module that turns the lights 550 on and off.

Referring again to FIG. 5A and FIG. 5B, the switch 558 is located on the middle section 510 and in electrical communication with the controller 554, and enables selective activation of the light engine 540, including selective toggling between the modules 564 stored on the controller 554. In some embodiments, the switch 558 is a button, a touch sensor (e.g., a capacitance or resistance sensor), or the like. In some embodiments, the wand 500 does not include a physical switch 558 per se. In some embodiments (with or without a physical switch 558), the controller 554 is configured to communicate with a mobile device such as a smart phone, tablet, etc.; in such embodiments, the mobile device enables selective activation of the light engine 540. Further, a hole 566 passes through the middle section 510, through the light engine 540, and is configured to receive a tether such as the tether 204 of FIG. 2A. The hole 566 of FIG. 5 passes through an off-center location of the outer housing 542 (e.g., an off-center location spaced apart from the longitudinal center by 1 cm to 10 cm), in order to facilitate a fast return to a vertical position when the wand 500 is suspended from a tether.

Thus, the middle section 510 has a light engine 540 that transmits light through the poles 512. The controller 554 (an in particular modules 564) enables the light engine 540 to create a number of visual effects that render the wand 500 more entertaining, especially during creative performances. Furthermore, the middle section 510 has receiver portions 518 configured to securely hold the poles 512 and to resist breakage. Further still, the middle section 510 includes features (e.g., the off-center hole 566) configured to impart desirable balance and handling characteristics to the wand 500. These are just some of the advantages of the wand 500.

Figure 7:
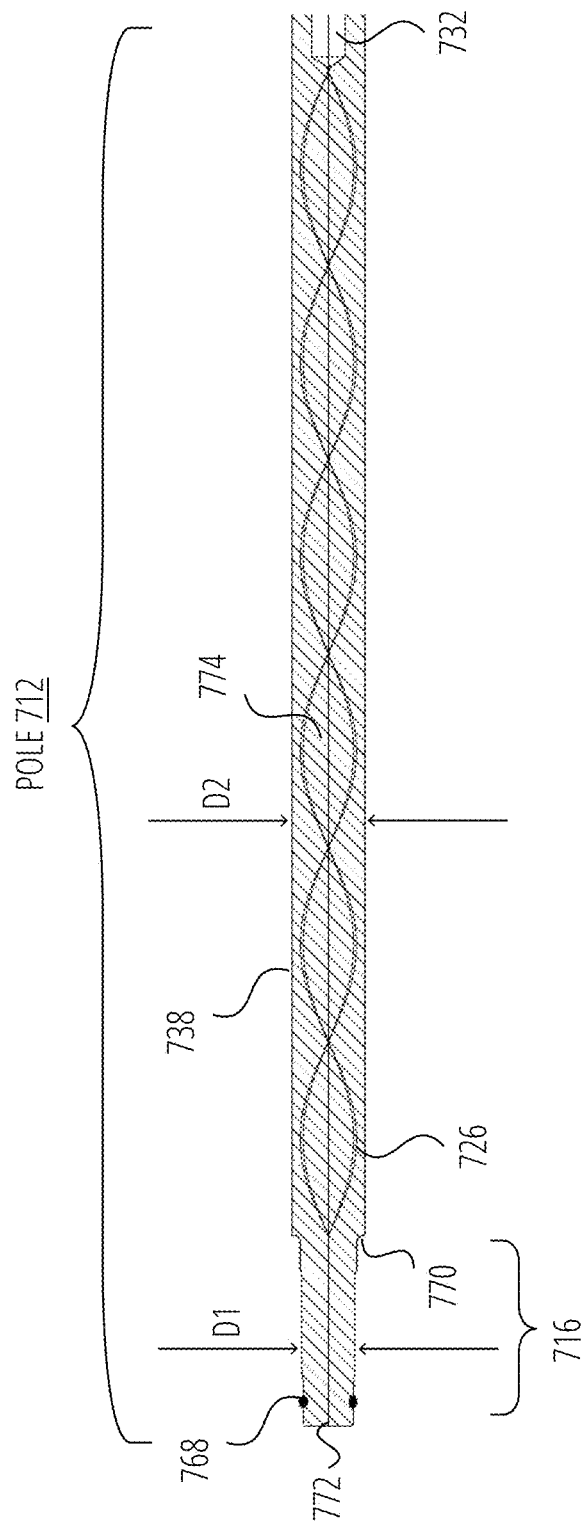
FIG. 7 shows a side section view of a pole of a wand formed in accordance with another representative embodiment of the present disclosure.

FIG. 7 shows another representative pole 712 formed in accordance with the present disclosure and configured for coupling with a middle section of a wand portion, such as the middle section 210 of FIG. 2A, or a wand having a light engine such as described with respect to the light engine 540 of FIG. 5A and FIG. 5B. Except where described below, the pole 712 has similar features as the pole 312 of FIG. 3. For example, the pole 712 includes optional and integrally-formed passive light features 726 formed as helical etches. Additionally, the pole 712 includes an end cap connection portion 732 formed at an end thereof. Additionally, the pole 712 is at least partially formed from a translucent material in order to facilitate transmission of light therethrough.

The pole 712 has an insertion end 716 configured for insertion into a receiver portion of a middle section (e.g., the middle section 210 of FIG. 2A). Whereas in FIG. 3, the pole 312 is configured for threaded coupling with the receiver portion, the insertion end 716 of pole 712 has an elongate insertion portion 772 configured to couple with a receiver portion simply by insertion. In particular, the insertion portion 772 includes at least one engagement member 768 (e.g., an O-ring) fitted thereto and configured to engage the receiver portion, thereby stably retaining the insertion portion 772 within the receiver portion of a compatible middle section, and thus coupling the pole 712 to the middle section. In some embodiments, the receiver portion of the compatible middle section includes a retention portion (e.g., a detent) configured to engage the engagement member 768 of the pole 712 when the insertion end 716 is inserted into the receiver portion. In some embodiments, the insertion portion 772 has both a threaded portion (as in FIG. 3), and one or more engagement members 768.

In FIG. 7, the insertion portion 772 has a first cross-sectional dimension D1, whereas a main body 774 has a larger second cross sectional dimension D2. This creates a shoulder 770 between the insertion portion 772 and the main body 774 that prevents over-insertion of the insertion portion 772 into the receiver portion. In some embodiments, the insertion portion 772 and the main body 774 have a uniform diameter, i.e., D1 is approximately equal to D2. In such embodiments, there is substantially no shoulder 770; additionally, such embodiments lack a stress concentration point where D1 transitions to D2. In still other embodiments, D1 exceeds D2.

Thus, the present disclosure provides wands having a number of advantages that make the wand well-suited for creative routines. Representative wands include a light engine configured to transmit light through one or more portions of the wand such as one or more translucent poles. In some embodiments, the light engine is programmed with one or more executable modules that cause one or more lights to change color, express an illumination pattern, etc. In some embodiments, a plurality of poles are configured to couple with a middle section of the wand in a manner that improves durability and transmission of light from the light engine. Other representative wands are configured to break down from an axially-aligned assembled state to a disassembled state. Still other representative wands have particular features (e.g., an off-center tether hole) configured to impart desirable balance characteristics. These advantages are representative, not limiting.

Additional novel features of the illuminated levitating wand will be apparent from the enclosed disclosure, and are not limited to the specific embodiment disclosed herein. Furthermore, the ornamental design of the wand itself and one or more components is highly appealing.

While illustrative embodiments have been illustrated and described, it will be appreciated that various changes can be made therein without departing from the spirit and scope of the invention. Features of different embodiments disclosed herein may be combined to form additional embodiments that are within the scope of the present disclosure.

Embodiments disclosed herein may utilize circuitry in order to implement technologies and methodologies described herein, operatively connect two or more components, generate information, determine operation conditions, control an appliance, device, or method, and/or the like. Circuitry of any type can be used. In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), or the like, or any combinations thereof, and can include discrete digital or analog circuit elements or electronics, or combinations thereof.

In an embodiment, circuitry includes one or more ASICs having a plurality of predefined logic components. In an embodiment, circuitry includes one or more FPGA having a plurality of programmable logic components. In an embodiment, circuitry includes hardware circuit implementations (e.g., implementations in analog circuitry, implementations in digital circuitry, and the like, and combinations thereof). In an embodiment, circuitry includes combinations of circuits and computer program products having software or firmware instructions stored on one or more computer readable memories that work together to cause a device to perform one or more methodologies or technologies described herein. In an embodiment, circuitry includes circuits, such as, for example, microprocessors or portions of microprocessor, that require software, firmware, and the like for operation. In an embodiment, circuitry includes an implementation comprising one or more processors or portions thereof and accompanying software, firmware, hardware, and the like. In an embodiment, circuitry includes a baseband integrated circuit or applications processor integrated circuit or a similar integrated circuit in a server, a cellular network device, other network device, or other computing device. In an embodiment, circuitry includes one or more remotely located components. In an embodiment, remotely located components are operatively connected via wireless communication. In an embodiment, remotely located components are operatively connected via one or more receivers, transmitters, transceivers, or the like.

An embodiment includes one or more data stores that, for example, store instructions or data. Non-limiting examples of one or more data stores include volatile memory (e.g., Random Access memory (RAM), Dynamic Random Access memory (DRAM), or the like), non-volatile memory (e.g., Read-Only memory (ROM), Electrically Erasable Programmable Read-Only memory (EEPROM), Compact Disc Read-Only memory (CD-ROM), or the like), persistent memory, or the like. Further non-limiting examples of one or more data stores include Erasable Programmable Read-Only memory (EPROM), flash memory, or the like. The one or more data stores can be connected to, for example, one or more computing devices by one or more instructions, data, or power buses.

In an embodiment, circuitry includes one or more computer-readable media drives, interface sockets, Universal Serial Bus (USB) ports, mini-USB ports, memory card slots, or the like, and one or more input/output components such as, for example, a graphical user interface, a display, a keyboard, a keypad, a trackball, a joystick, a touch-screen, a mouse, a switch, a dial, or the like, and any other peripheral device. In an embodiment, circuitry includes one or more user input/output components that are operatively connected to at least one computing device to control (electrical, electromechanical, software-implemented, firmware-implemented, or other control, or combinations thereof) one or more aspects of the embodiment.

In an embodiment, circuitry includes a computer-readable media drive or memory slot configured to accept signal-bearing medium (e.g., computer-readable memory media, computer-readable recording media, or the like). In an embodiment, a program for causing a system to execute any of the disclosed methods can be stored on, for example, a computer-readable recording medium (CRMM), a signal-bearing medium, or the like. Non-limiting examples of signal-bearing media include a recordable type medium such as any form of flash memory, magnetic tape, floppy disk, a hard disk drive, a Compact Disc (CD), a Digital Video Disk (DVD), Blu-Ray Disc, a digital tape, a computer memory, or the like, as well as transmission type medium such as a digital and/or an analog communication medium (e.g., a fiber optic cable, a waveguide, a wired communications link, a wireless communication link (e.g., transmitter, receiver, transceiver, transmission logic, reception logic, etc.). Further non-limiting examples of signal-bearing media include, but are not limited to, DVD-ROM, DVD-RAM, DVD+RW, DVD-RW, DVD−R, DVD+R, CD-ROM, Super Audio CD, CD−R, CD+R, CD+RW, CD−RW, Video Compact Discs, Super Video Discs, flash memory, magnetic tape, magneto-optic disk, MINIDISC, non-volatile memory card, EEPROM, optical disk, optical storage, RAM, ROM, system memory, web server, or the like.

The detailed description set forth above in connection with the appended drawings, where like numerals reference like elements, are intended as a description of various embodiments of the present disclosure and are not intended to represent the only embodiments. Each embodiment described in this disclosure is provided as an example or illustration and should not be construed as preferred or advantageous over other embodiments. The representative examples provided herein are not intended to be exhaustive or to limit the disclosure to the precise forms disclosed. Similarly, any steps described herein may be interchangeable with other steps, or combinations of steps, in order to achieve the same or substantially similar result. Generally, the embodiments disclosed herein are non-limiting, and the inventors contemplate that other embodiments within the scope of this disclosure may include structures and functionalities from more than one specific embodiment shown in the figures and described in the specification. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The present application may include references to directions, such as "vertical," "horizontal," "front," "rear," "left," "right," "top," and "bottom," etc. These references, and other similar references in the present application, are intended to assist in helping describe and understand the particular embodiment (such as when the embodiment is positioned for use) and are not intended to limit the present disclosure to these directions or locations.

The present application may also reference quantities and numbers. Unless specifically stated, such quantities and numbers are not to be considered restrictive, but representative of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

What is claimed is:

1. A wand, comprising:
a middle section at least partially housing a light engine, wherein the light engine comprises a first light, a second light, a power source, and a controller, wherein the controller and the power source are positioned between the first light and the second light; and
a first pole and a second pole, each of the first pole and second pole being configured to couple to the middle section in an axially-aligned assembly;
wherein the light engine transmits light axially outwardly through the first pole and the second pole.

2. The wand of claim 1, wherein the controller is programmed with at least one module that controls illumination of the first light and the second light.

3. The wand of claim 1, wherein the first light is located in the middle section adjacent to a first receiver portion thereof, and the second light is located in the middle section adjacent to a second receiver portion thereof.

4. The wand of claim 1, wherein the first light is located in the first pole and the second light is located in the second pole, wherein each of the first pole and the second pole have an electrical contact that establishes electrical communication with the controller and the power source when the electrical contact is coupled to the middle section in the axially-aligned assembly.

5. The wand of claim 1, wherein the first pole and the second pole are reversibly couplable to the middle section such that the wand is configured to break down into to a disassembled state in which the first pole and the second pole are not coupled with the middle section.

6. The wand of claim 1, wherein the middle section includes two axially-aligned receiver portions located at opposite ends thereof, each receiver portion having a cavity with an open end facing axially away from the middle section, wherein each of the first pole and the second pole have an insertion end configured for insertion into the cavity of at least one of the two axially-aligned receiver portions.

7. The wand of claim 6, wherein each insertion end includes a threaded portion, and wherein each receiver portion includes a complementary threaded portion.

8. The wand of claim 7, wherein the complementary threaded portion of the receiver portion is a translucent threaded pin.

9. The wand of claim 6, wherein each insertion end includes an engagement member fitted thereto, and each receiver portion includes a retention portion configured to engage the engagement member.

10. The wand of claim 6, wherein each receiver portion includes a shroud that covers at least a portion of the first pole or the second pole when the first pole or the second pole are coupled with the middle section.

11. The wand of claim 10, wherein the shroud is configured to cover about 1cm to about 10 cm of the first pole or the second pole.

12. The wand of claim 10, wherein the shroud is configured to at least partially cover a maximum diameter portion of the first pole or a maximum diameter portion of the second pole.

13. The wand of claim 1, wherein the first pole and the second pole each have an indicator on an outer surface thereof that indicates proper coupling with the middle section.

14. The wand of claim 1, further comprising:
a tether connected to the middle section;
a holding piece connected to the tether;
a first end cap couplable to the first pole;
a second end cap couplable to the second pole; and
a charging cord configured to electrically communicate with the light engine.

15. The wand of claim 14, wherein the tether passes through a hole in the middle section positioned between 1 cm and 10 cm from a longitudinal center of the middle section.

16. The wand of claim 14, wherein each end cap has a maximum width that exceeds a maximum width of the first pole and the second pole.

17. The wand of claim 1, wherein the first pole has a first weight, and the second pole has a second weight that differs from the first weight.

18. A wand, comprising:
a middle section at least partially housing a light engine and comprising two axially-aligned receiver portions located at opposite ends thereof, each of the two receiver portions comprising a translucent pin disposed in a cavity having an open end facing axially away from the middle section; and
a first pole and a second pole, each of the first pole and the second pole comprising an insertion end configured for coupling with the translucent pin of at least one of the two receiver portions,
wherein the light engine transmits light axially outwardly through each translucent pin, the first pole, and the second pole.

19. The wand of claim 18, wherein each translucent pin comprises coupling structure at an axially outer end thereof, wherein the insertion end of each of the first pole and the second pole is configured for coupling with the coupling structure of at least one of the translucent pins.

20. The wand of claim 18, wherein each translucent pin is formed of a soft polymer.

* * * * *